Nov. 14, 1967 V. G. NORUM 3,352,182
VALVE GUIDE REAMING ASSEMBLY
Filed Feb. 23, 1965
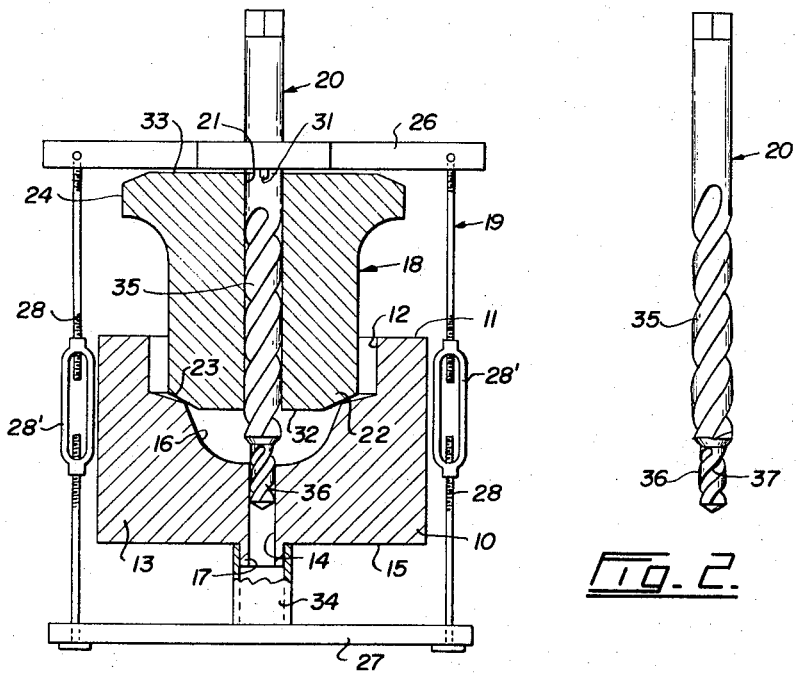
Fig. 1.
Fig. 2.
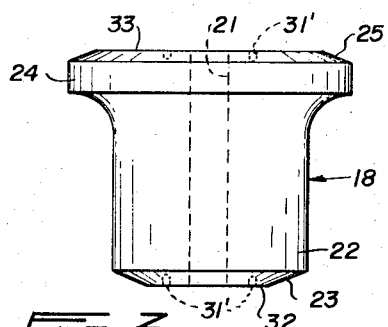
Fig. 3.
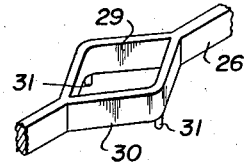
Fig. 5.
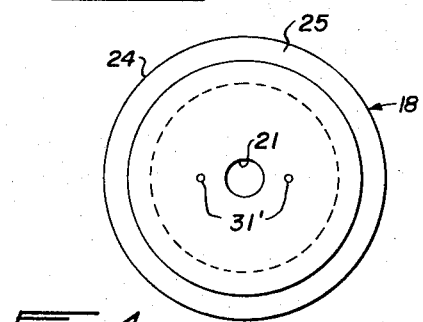
Fig. 4.
INVENTOR
VERNON G. NORUM
BY
ATTORNEY

United States Patent Office 3,352,182
Patented Nov. 14, 1967

3,352,182
VALVE GUIDE REAMING ASSEMBLY
Vernon G. Norum, Box 243, Rosetown,
Saskatchewan, Canada
Filed Feb. 23, 1965, Ser. No. 434,464
Claims priority, application Canada, Feb. 29, 1964,
896,821
4 Claims. (Cl. 77—62)

ABSTRACT OF THE DISCLOSURE

This invention relates to devices to facilitate the reaming out of integrally formed valve guides in cylinder heads for automotive engines. It consists of a clamping device holding a guide block centrally on the valve seat, said guide being centrally apertured to receive the reamer. The fact that the guide block is held on the valve seat assures that the reamed out valve guide is concentric with the valve seat.

---

My invention relates to new and useful improvements in valve guide reaming assemblies, particularly integrally formed valve guides normally provided in cylinder heads for automotive engines.

When originally manufactured, the valve guide drilling within a cylinder head is concentrically located with respect to the valve seat so that the valve stem engages the guide accurately and locates the valve head upon the seat.

However, during use, the valve guides wear and it is usual to ream out the valve guide so that it will receive an oversize valve stem.

It will be appreciated that only one or two of such reamings can be undertaken as the amount of oversize for the valve stems is limited due to weight considerations and the like.

Furthermore it is often difficult to obtain valves with oversized stems when required, necessitating the car being out of action for some considerable time while such oversize valves and stems are obtained.

It is therefore advantageous to bore out worn valve guides to a diameter sufficient to permit the insertion of valve guide bushings which may in turn become worn, but which are easily replaced with standard size bushings so that the original valves can still be utilized or, if they are worn, replacement valves having stems of the original size.

The difficulties encountered in reaming out worn valve guides for the reception of bushings derive mainly from the fact that valve guides normally wear unevenly and are sometimes oval particularly at the upper ends thereof immediately below the valve head so that if a conventional reamer is used, it is extremely difficult to center the drilled out valve guide with the head thus necessitating valve seat inserts which are expensive and difficult to install.

I have overcome these disadvantages by using a guide block for the drill which is clamped to the valve seat thus automatically centering the drill with the valve seat and ensuring that the bored out valve guide is concentric with respect to the valve seat.

This is in conjunction with a novel clamp device, makes the installation of valve guide bushings an extremely easy and economical operation and eliminates the necessity of valve seat inserts unless the original valve seats are badly burned or distorted.

The principal object and essence of my invention is therefore to provide a device of the character herewithin which permits the drilling out of valve guides to receive valve guide bushings while ensuring that such valve guide drillings remain concentrically located with respect to the valve seat.

Another object of my invention is to provide a device of the character herewithin described which permits the clamping assembly to be rapidly and accurately located with respect to the guide block and the valve guide.

A yet further object of the invention is to provide a device of the character herewithin described in which the same guide block can be used for the relatively large inlet valve seatings and also with the smaller exhaust valves.

A still further object of the invention is to provide a device of the character herewithin described which reduces the time and labour involved in fitting valve guide bushings.

Another object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is an end section of a cylinder head showing my device in position.

FIGURE 2 is a side elevation of the drill per se.

FIGURE 3 is a side elevation of the guide block per se.

FIGURE 4 is a top plan view of FIGURE 3.

FIGURE 5 is an enlarged fragmentary isometric view of one embodiment of the upper strap.

In the drawings, like characters of reference indicate corresponding parts in the different figures.

Proceeding therefore to describe my invention in detail, reference to FIGURE 1 shows an end sectional view of a cylinder head 10, it being understood that this has been removed from the car and turned with the block engaging face 11 uppermost. The cylinder head portion 12 of the combustion chamber also includes the conventional truncated cone shaped valve seating 13 and a valve guide aperture or drilling 14 extending through the block to the outer surface 15, reference character 16 illustrating a portion of the valve port which, of course, is connected to the conventional manifold (exhaust or inlet) (not illustrated).

A valve spring retaining shoulder 17 is formed upon the outer surface 15 and surrounds the integrally formed valve guide drilling 14.

My invention includes a valve seat engaging block collectively designated 18, a clamping assembly collectively designated 19 and a valve guide reamer collectively designated 20.

The valve seat engaging block 18 is substantially cylindrical in configuration and is provided with an axially located drilling 21 formed from end to end which acts as a guide for the aforementioned reamer 20.

The lower end 22 of the block is provided with a truncated cone shaped valve seat engaging surface 23, the angle of inclination of the facing being greater than the angle of inclination of the valve seat so that it will engage same as shown in FIGURE 1 with a slight wedging action thus locating the drilling 21 concentrically above the valve guide drilling 14.

The upper end 24 of the block is enlarged and is also provided with a truncated cone shaped seating 25 having a diameter larger than the seating 23 so that the same block can be used for inlet and exhaust valves, it being understood that normally, the inlet valve is of a larger diameter than the exhaust valve.

The clamping assembly 19 consists of an upper strap 26, a lower strap 27, and a pair of spaced and parallel bolt and turnbuckle assemblies 28 engaging the ends of the two straps as clearly illustrated.

The upper strap 26 is centrally apertured as at 29 to receive the reamer 20. In FIGURE 5 I have shown a strap in which the central portion 30 is expanded in the configuration shown to pass around the reamer 20. Upon each side of the aperture or portion 30, a lug 31 is formed upon the underside thereof, said lugs engaging corresponding depressions 31 formed upon each side of the drilling 21 on both ends 32 and 33 of the block 18 thus facilitating the location of the upper strap 26 as the clamp is being fitted to the block.

Also these lugs hold the upper strap clear of the cylinder head and pivot the strap on the block to facilitate the correct location of the block within the valve seat.

The lower strap 27 is provided with a substantial centrally located upstanding collar or tube 34 adapted to engage around the aforementioned spring retaining collar 17 thus assisting in locating the lower strap with respect to the block 18 and the valve guide drilling 14.

The bolts 28, provided with turn-buckles 28' clamp the two straps together thus holding the block 18 firmly in the desired position engaging the valve seating 13.

Although it is not illustrated, it is desired that one end of the strap 26 be slotted rather than apertured so that the bolt 28 can readily be engaged without the necessity of having to remove the turn-buckles 28'.

The drill 20 consists of the main reaming or drilling portion 35 which may be either spirally ground or fluted as desired and a reduced diameter pilot portion 36 formed on the lower end of the drill which may be spirally grooved as at 37 but should not be provided with cutting edges.

The diameter of the pilot portion 37 is decided by the diameter of the valve guide drilling 14 and may be provided in standard oversize dimensions so that it can be used with valve guide drillings, which have already been drilled to receive oversize valve stems.

The diameter of the drill portion 35 is chosen to suit the outside diameter of the valve guide bushing to be used and is desirably a few thousandths of an inch undersize so that a conventional finishing reamer can be used to bring the drilled out valve guide to the correct dimension to receive the standard or conventional valve guide bushing.

In operation, the device can be assembled as hereinbefore described and the drill can be connected to an electric drill.

In the event that the valve seat 13 is burned or pitted, this should, of course, be refaced sufficiently to enable the block to be located correctly and refinished after the reaming of the valve guide drilling and installation of the new guide has been completed.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:
1. An assembly for reaming integral valve guides in a cylinder head with a valve guide drill which includes a pilot guide portion on the guide engaging end thereof, said head including a valve seat, a valve guide and a spring retaining collar on the outer side of said head surrounding said valve guide; said assembly comprising in combination a valve seat engaging block, said block having a truncated cone-shaped facing formed on one end thereof engageable with the associated valve seating, a concentrically positioned axially located guide drilling formed through said block, and clamp means for coacting between said block and the cylinder head for clamping said block in position on the associated valve seating, said block being substantially cylindrical and being provided with a truncated cone-shaped facing on each end thereof, the diameter of one of said facings being seized to engage associated valve seats of one size, the diameter of the other of said facings being seized to engage associated valve seats of another size.

2. The device according to claim 1 in which said clamp means includes an upper strap and a lower strap and a pair of spaced and parallel bolt and fastening assemblies extending between the ends of said straps, said lower strap having a valve spring retaining collar engaging means substantially centrally located thereon.

3. The device according to claim 1 in which said clamp means includes an upper strap and a lower strap and a pair of spaced and parallel bolt and fastening assemblies extending between the ends of said straps, said upper strap being centrally apertured to receive said reamer and having locating means depending from the underside thereof adapted to engage depressions in the end of said block to align said aperture in said strap with said guide drillings in said block.

4. The device according to claim 1 in which said clamp means includes an upper strap and a lower strap and a pair of spaced and parallel bolt and fastening assemblies extending between the ends of said straps, said lower strap having a valve spring retaining collar engaging means substantially centrally located thereon, said upper strap being centrally apertured to receive said drill and having locating means depending from the underside thereof adapted to engage depressions in the end of said block to align said aperture in said strap with said guide drilling in said block.

References Cited

FOREIGN PATENTS 13,340   1904   Great Britain.

FRANCIS S. HUSAR, *Primary Examiner.*